United States Patent [19]
Frost

[11] Patent Number: 5,411,447
[45] Date of Patent: May 2, 1995

[54] FULL-TIME INTEGRATED PLANETARY FOUR-WHEEL DRIVE TRANSFER CASE WITH TRACTION

[75] Inventor: Barry L. Frost, Waterford, Mich.

[73] Assignee: New Venture Gear, Inc., Troy, Mich.

[21] Appl. No.: 148,470

[22] Filed: Nov. 5, 1993

Related U.S. Application Data

[63] Continuation-in-part of Ser. No. 961,486, Oct. 15, 1992, Pat. No. 5,284,068.

[51] Int. Cl.⁶ .............................................. F16H 1/42
[52] U.S. Cl. ...................................... 475/223; 475/225; 475/298
[58] Field of Search ................. 475/223, 225, 298, 332

[56] References Cited

U.S. PATENT DOCUMENTS

| | | | |
|---|---|---|---|
| 2,853,890 | 9/1958 | Kelbel | 74/665 GA |
| 4,215,593 | 8/1980 | Shono | 475/250 |
| 4,344,335 | 8/1982 | Kawai | 475/223 |
| 4,644,822 | 2/1987 | Batchelor | 475/204 |
| 4,677,875 | 7/1987 | Batchelor | 475/85 |
| 4,805,484 | 2/1989 | Hiraiwa | 74/665 T |
| 5,148,900 | 9/1992 | Mohan | 192/58 C |
| 5,176,235 | 1/1993 | Williams | 192/58 B |
| 5,284,068 | 2/1994 | Frost | 74/665 GA |
| 5,358,454 | 10/1994 | Bowen et al. | 475/94 |

*Primary Examiner*—Dirk Wright
*Attorney, Agent, or Firm*—Harness, Dickey & Pierce

[57] ABSTRACT

The present invention relates to the arrangement of a gear reduction unit and an interaxle differential mechanism as an "integrated" planetary-type gear assembly which is adapted for use in the transfer case of a four-wheel drive motor vehicle and further includes means for modifying the torque output and locking the "integrated" planetary-type gear assembly in response to various driving conditions.

20 Claims, 7 Drawing Sheets

FULL-TIME INTEGRATED PLANETARY FOUR-WHEEL DRIVE TRANSFER CASE WITH TRACTION

CROSS-REFERENCE TO RELATED APPLICATIONS

This application is a continuation-in-part of Ser. No. 07/961,486, filed Oct. 15, 1992, now U.S. Pat. No. 5,284,068 and entitled "Transfer Case With Integrated Planetary Gear Assembly".

BACKGROUND OF THE INVENTION

The present invention relates generally to transfer cases for four-wheel drive vehicles and, more particularly, to such a transfer case having a gear reduction unit and an inter-axle differential integrated into a planetary gear assembly for providing a variety of part-time and full-time four-wheel drive operating modes.

Modernly, many light-duty and sport-utility vehicles are equipped with a power transfer unit, such as a four-wheel drive transfer case, for providing a four-wheel drive mode of operation. To accommodate differing road surfaces and conditions, many four-wheel drive transfer cases are equipped with a gear reduction unit for providing a high-range (i.e., direct drive) and a low-range (i.e., reduced ratio drive) in conjunction with the four-wheel drive mode. Most commonly, the gear reduction units used in four-wheel drive transfer cases include either a layshaft arrangement or a planetary gear assembly. In addition, some transfer cases are also equipped with an interaxle differential mechanism for permitting torque proportioning and differential speed variations between the front and rear axles of the four-wheel drive vehicle. Reference may be made to U.S. Pat. No. 4,677,873 for disclosure of an exemplary four-wheel drive transfer case equipped with a planetary gear reduction unit and a planetary interaxle differential mechanism.

In an effort to minimize the overall size of transfer cases, it has been proposed to incorporate the gear reduction unit and the interaxle differential mechanism into a single planetary gear assembly. One such arrangement is described in U.S. Pat. No. 4,644,822 which discloses a transfer case having "back-to-back" first and second planetary gear sets having common components which can be selectively shifted as a unit to establish the different four-wheel drive modes. In addition, U.S. Pat. Nos. 4,677,875, 4,344,335, 4,215,593 and 4,805,484 each disclose a transfer case having a single planetary gear assembly which is operable to establish various drive modes through manipulation of one or more suitable shift mechanisms. While such prior art arrangements provide a compact construction, there is a continuing need to develop low cost, simplified alternatives which meet modern requirements for low noise and weight.

SUMMARY OF THE INVENTION

It is therefore an object of the present invention to provide a transfer case for a four-wheel drive vehicle having an "integrated" planetary gear assembly which incorporates a gear reduction unit and an interaxle differential mechanism into a single unit. The integrated planetary gear assembly is adapted to be selectively shifted between various operating positions for establishing a two-wheel drive mode, a part-time four-wheel high-range mode, a full-time four-wheel high-range mode, and a part-time four-wheel low-range mode. As a related object, an additional operating position is provided for defining a Neutral mode to accommodate towing of the vehicle.

Another object of the present invention is to provide a transfer case for a full time four-wheel drive vehicle having an "integrated" planetary gear assembly which incorporates a gear reduction unit and an interaxle differential mechanism into a single unit for providing a full-time differentiated four-wheel high-range mode and a part-time four-wheel low-range mode, and further having a torque transfer device operably associated with the integrated planetary assembly for selectively modifying the torque distribution of and locking the interaxle differential for providing an "on demand" four-wheel drive traction mode.

According to a preferred embodiment of the present invention, the integrated planetary gear assembly is operably installed between an input member and first and second output members of the transfer case and is constructed in a compact dual-planetary arrangement having dual sun gears and dual planet gears that are journally supported from a carrier. In the two-wheel drive mode, the carrier is rotatably driven by the input member and is coupled to the first output member for transferring drive torque thereto. In the part-time four-wheel high-range mode, the carrier directly couples the input member to both of the first and second output members so as to inhibit differential action therebetween. In the full-time four-wheel high-range mode, the carrier is driven by the input member while the first and second sun gears respectively engage the first and second output members in a manner facilitating differential action and torque proportioning therebetween. When shifted to the Neutral mode, the first and second sun gears are disengaged from their respective output members such that no drive torque is transferred from the input member and carrier to either of the first and second output members. Finally, upon movement of the planetary gear assembly to the part-time four-wheel low-range mode, the carrier is directly coupled to both of the first and second output members, the first sun gear is coupled to the input member and the second sun gear is coupled to a grounded member such that the carrier is rotatably driven at a reduced speed and no differentiation between the output members is permitted.

In another preferred embodiment of the present invention, the integrated planetary gear assembly is operably installed between an input member and first and second output members of the transfer case and is constructed in a compact dual-planetary arrangement having dual sun gears and dual planet gears that are journally supported from a carrier. In the full-time four-wheel high-range mode, the carrier is driven by the input member while the first and second sun gears respectively engage the first and second output members in a manner facilitating differential action and torque proportioning therebetween. When shifted to the Neutral mode, the first and second sun gears are disengaged from their respective output members such that no drive torque is transferred from the input member and carrier to either of the first and second output members. Finally, upon movement of the planetary gear assembly to the part-time four-wheel low-range mode, the carrier is directly coupled to both of the first and second output members, the first sun gear is coupled to the input member and the second sun gear is coupled to a grounded member such that the carrier is rotatably driven at a reduced speed and no differentiation between the output members is permitted. A torque transfer device, for example, a viscous coupling or geared torque coupling, is also provided and is operably associated with the integrated planetary assembly. The torque transfer device is operable for providing a modified torque output of the integrated planetary assembly and for selectively locking the integrated planetary gear assembly for inhibiting differential action between the first and second output members thereby providing a non-differentiated four-wheel drive traction mode.

Additional objects, features and advantages of the present invention will become apparent from studying the following detailed description and appended claims when taken in conjunction with the accompanying drawings.

DETAILED DESCRIPTION OF THE INVENTION

In general, the present invention relates to the arrangement of a gear reduction unit and an interaxle differential mechanism as an "integrated" planetary-type gear assembly which is adapted for use in the transfer case of a four-wheel drive motor vehicle. The integrated planetary gear assembly of the present invention offers the advantages of a compact and simplified structure, reduced weight, quiet operation and elimination of an internally toothed annulus gear which is commonly used in conventional arrangements. The present invention further provides for operably interconnecting a torque transfer device to the integrated planetary gear assembly for modifying the torque output of the integrated planetary assembly and for selectively inhibiting the differential action for providing a non-differentiated or "on demand" four-wheel drive traction mode.

Figure 1:
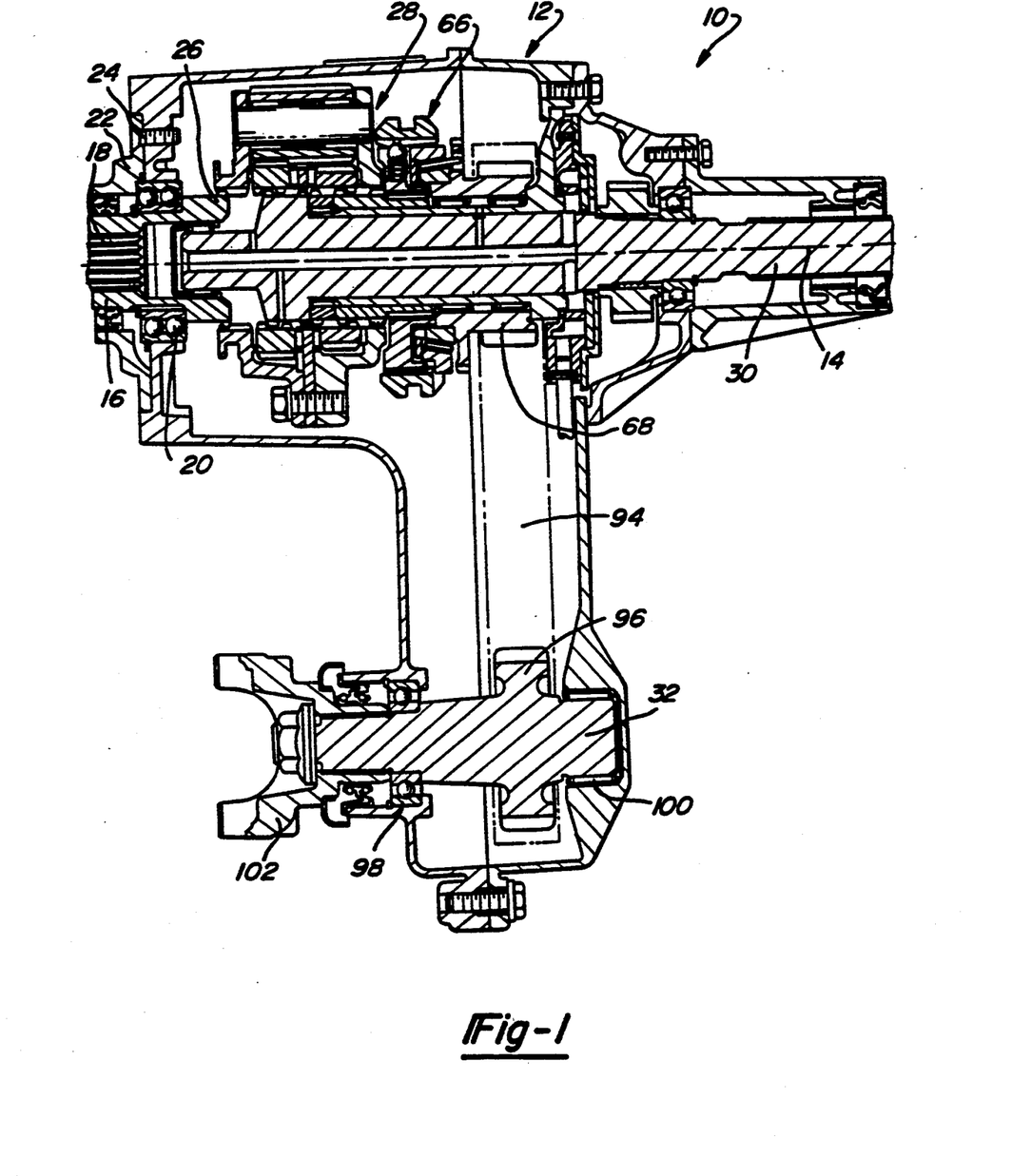
FIG. 1 is a sectional view of an exemplary four-wheel drive transfer case incorporating an integrated planetary gear assembly constructed in accordance with a preferred embodiment of the present invention.

With particular reference to FIG. 1 of the drawings, there is shown an exemplary transfer case 10 according to a preferred embodiment of the present invention and of the type adapted for use in virtually any four wheel drive motor vehicle. As is known, transfer case 10 is operable for selectively transferring power (i.e., drive torque) from the motor vehicle's drivetrain (i.e., engine and transmission) to its front and rear axle assemblies. According to the construction shown, transfer case 10 includes a housing 12 that is adapted to receive a transmission output shaft (not shown) from the vehicle's drivetrain for rotation about a longitudinal axis 14. More specifically, an input shaft 16 is aligned for rotation along central axis 14 and has internal splines 18 that engage the external splines of the transmission output shaft. Input shaft 16 is supported for rotation in housing 12 by a bearing assembly 20 and is retained therein by an annular collar 22 secured to housing 12 such as by a plurality of screws 24. An externally toothed input gear 26 is integrally formed on input shaft 16 for transferring drive torque from the transmission output shaft to a combination gear reduction unit and interaxle differential mechanism, hereinafter referred to as "integrated" planetary gear assembly 28. As will be discussed hereinafter, integrated planetary gear assembly 28 is operably installed between input shaft 16 and first and second output members for axial sliding movement relative thereto. Such axial movement of integrated planetary gear assembly 28 is adapted to establish various driving relationships between the first output member and the second output member which are respectively coupled to the motor vehicle's rear and front axle assemblies in a known manner.

Figure 2:
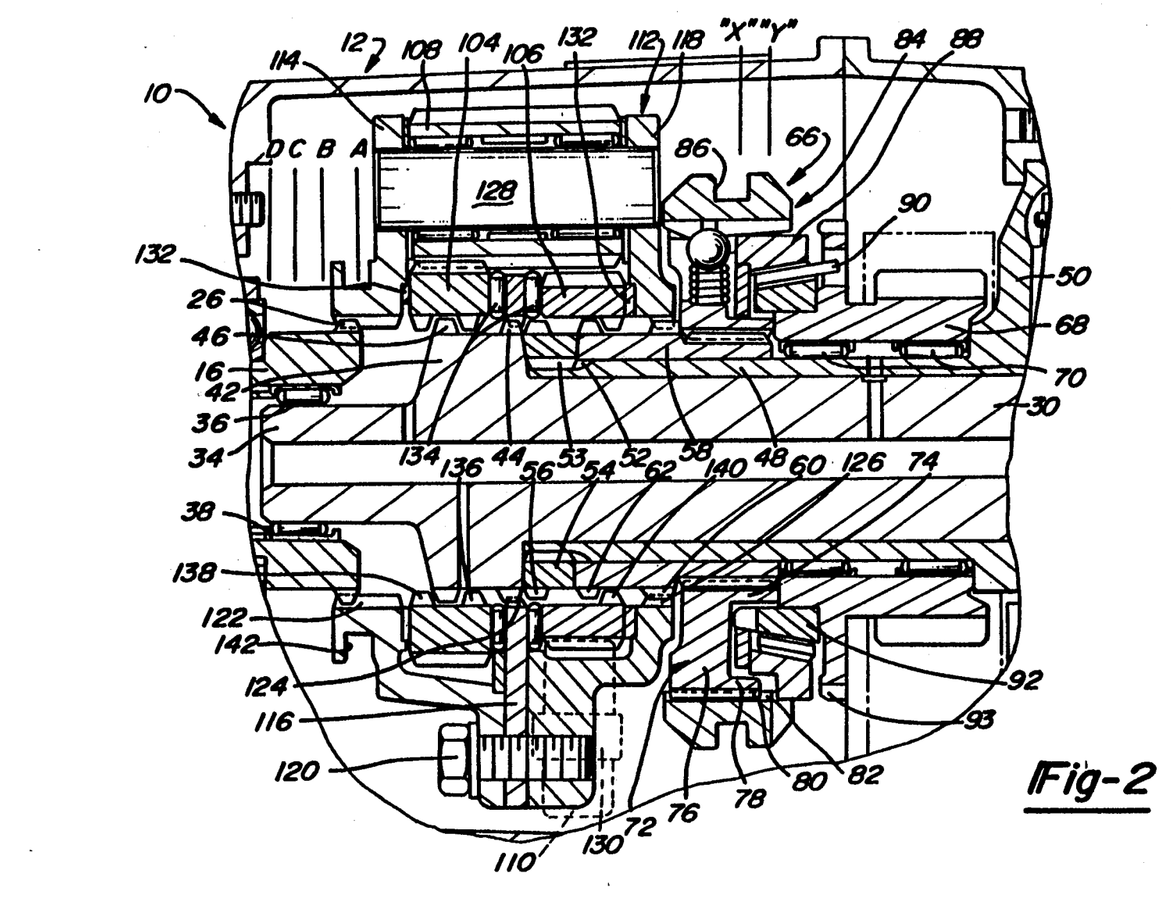
FIG. 2 is an enlarged fragmentary view of FIG. 1 illustrating the integrated planetary gear assembly in a two-wheel high-range mode.

With reference to FIGS. 1 and 2, the first output member of transfer case 10 is shown as a rear output shaft 30 which is aligned concentrically about longitudinal axis 14 and has a piloted end portion 34 that is journally supported via a suitable bearing assembly 36 within an axial counter-bore 38 formed in input shaft 16. Rear output shaft 30 has a radial extension 42 on which first and second sets of laterally spaced external clutch teeth 44 and 46, respectively, are formed. In addition, an elongated quill sleeve 48 surrounds rear output shaft 30 adjacent radial extension 42. Quill sleeve 48 is grounded (i.e., fixed) at a first end to housing 12 via a reaction flange 50 while external splines 52, formed at the second end of quill sleeve 48, engage internal spines 53 formed on an annular reaction ring 54. Thus, reaction ring 54 is non-rotatably supported on quill sleeve 48. In addition, reaction ring 54 is further shown to include external clutch teeth 56 that are longitudinally alignable with the first and second sets of clutch teeth 44 and 46, respectively, on rear output shaft 30. A tubular drive sleeve 58 is concentric with and supported on quill sleeve 48. Thus, reaction ring 54 is interposed between radial extension 42 of rear output shaft 30 and drive sleeve 58. In addition, drive sleeve 58 includes first and second sets of laterally spaced external clutch teeth 60 and 62, respectively. According to the first preferred embodiment of the present invention, a shift arrangement is provided for permitting the vehicle operator to selectively shift transfer case 10 between the various two-wheel and four-wheel drive modes. According to the embodiment shown in FIGS. 1 through 6, the shift arrangement would be operable for coupling drive sleeve 58 to a drive sprocket 68 which, in turn, is interconnected to the second output member of transfer case 10. Preferably, a synchronizer clutch apparatus 66 is provided to permit "on-the-fly" shifting of transfer case 10 between the two-wheel high-range drive mode and the four-wheel high-range drive mode. Synchronizer clutch apparatus 66 is operably located between drive sleeve 58 and drive sprocket 68 which is journally supported for rotation on quill sleeve 48 via suitable bearings assemblies 70. While synchronizer apparatus 66 can be of any conventional construction, it is preferably of the cone type disclosed in commonly owned U.S. Pat. No. 5,105,927, the disclosure of which is expressly incorporated by reference herein. However, it should be understood that any suitable synchronizer apparatus could be used without departing from the fair scope of the present invention.

With continued reference to FIG. 2, synchronizer clutch apparatus 66 is shown to include a hub 72 having an inner axial flange portion 74 fixed to drive sleeve 58 for rotation therewith. Hub 72 also includes a radially extending web portion 76 which has a longitudinally extending cylindrical portion 78 formed at its periphery. External splines 80 are formed on cylindrical portion 78 which are adapted to slidingly receive internal splines 82 of a "mode" shift sleeve 84 thereon. Thus, mode shift sleeve 84 is rotatable with and axially moveable relative to hub 72 in a well known manner by means of engagement of a suitable shift member (not shown) within an annular groove 86 formed in shift sleeve 84. As is known, axial movement of mode shift sleeve 84 from its central non-actuated position (FIG. 2) toward drive sprocket 68 causes frictional interaction between blocker ring 88, clutch cone 90 and inner cone 92. Such frictional interaction results in speed synchronization between mode shift sleeve 84 (and drive sleeve 58) and drive sprocket 68, thus allowing internal splines 82 of mode shift sleeve 84 to move into driving engagement with drive sprocket clutch teeth 93 (as shown, for example, in FIG. 3).

Returning to FIG. 1, a chain 94 interconnects drive sprocket 68 with a driven sprocket 96 formed on a front output shaft 32. Front output shaft 32 is supported and retained in housing 12 by suitable bearing assemblies 98 and 100. An output yoke 102 is secured to the forward end of front output shaft 32 and is adapted for connection to the front propeller shaft (not shown) for driving the front axle assembly and the front set of ground-engaging wheels of the motor vehicle. As will be appreciated, a similar yoke (not shown) is secured to the rearward end of rear output shaft 30 and is adapted for connection to the rear propeller shaft (not shown) for driving the rear axle assembly and the rear set of ground-engaging wheels of the motor vehicle.

In accordance with the preferred embodiments of the present invention, integrated planetary gear assembly 28 is a "dual-planetary" arrangement having first and second sun gears 104 and 106, respectively, that are adapted to drive or be driven by first and second sets of planet gears 108 and 110, respectively, that are supported for rotation from a common carrier assembly 112. Carrier assembly 112 includes a first carrier ring 114, a center plate 116, and a second carrier ring 118 that are suitably joined such as by a plurality of bolts 120, and having formed thereon internal splines 122, 124, and 126, respectively. First sun gear 104 has a different diameter than second sun gear 106, both of which are laterally spaced and axially positioned between first carrier ring 114 and center plate 116, and between center plate 116 and second carrier ring 118, respectively. In addition, first and second sun gears 104 and 106, respectively, are further restrained against axial movement within carrier assembly 112 by suitable thrust washers 132 and thrust bearings 134.

First sun gear 104 is formed with first and second sets of laterally spaced internal clutch teeth 136 and 138, respectively. As will be detailed, the first set of clutch teeth 136 is adapted to be selectively engagable with the second set of clutch teeth 46 on rear output shaft 30 in response to axial sliding movement of planetary gear assembly 28. Likewise, the second set of clutch teeth 138 are adapted for selective engagement with the external gear teeth of input gear 26 in response to still further axial movement of planetary gear assembly 28. Furthermore, second sun gear 106 is formed with a single set of internal clutch teeth 140 that are slidably engagable with either of the second set of clutch teeth 62 on drive sleeve 58 or clutch teeth 56 on reaction ring 54 upon axial movement of integrated planetary gear assembly 28 along central axis 14. It will be appreciated that axial movement of planetary gear assembly 28 is also accomplished utilizing the shift mechanism having a second shift member (not shown) engaged with an annular groove 142 formed in first carrier ring 114. Thus, the shift mechanism is operable for controlling axial movement of planetary gear assembly 28 and mode shift sleeve 84, such shift mechanism being manually or remotely (i.e., motor driven, hydraulically displaced or the like) actuated.

As noted, carrier assembly 112 is adapted to rotatably support the first set of full-length planet gears 108 and the second set of half-length planet gears 110, shown in phantom in FIG. 2. Preferably, the first set of full-length planet gears 108 extend longitudinally substantially the full axial extent between first and second carrier rings 114 and 118. Likewise, the second set of half-length planet gears 110 extend longitudinally substantially the full axial extent between center plate 116 and second carrier ring 118. Moreover, the full-length planet gears 108 are journally supported for rotation on first pins 128 while half-length planet gears 110 are journally supported for rotation on second pins 130, also shown in phantom in FIG. 2. First sun gear 104 is in meshed engagement with the first set of full-length planet gears 108 while second sun gear 106 is in meshed engagement with the second set of half-length planet gears 110. In addition, each one of the second set of half-length planet gears 110 is intermeshed with an associated one of the first set of full-length planet gears 108. Thus, when transfer case 10 is operating in a full-time four-wheel drive mode, integrated planetary gear assembly 28 functions to divide the input torque supplied to rear and front output shaft 30 and 32, respectively, in a manner proportional to the number of teeth on first and second sun gears 104 and 106, respectively.

Shifting of transfer case 10 into its various drive modes is accomplished by axially sliding mode shift sleeve 84 and/or planetary gear assembly 28 along central axis 14, thereby selectively coupling various driven elements thereof with the transfer case input and output members. With reference now to FIGS. 2 through 6, the various drive modes of transfer case 10 will now be described. In the two-wheel high-range mode position of FIG. 2, planetary gear assembly 28 is located at position "A" and mode shift sleeve 84 is located at a disengaged "X" position. In this arrangement, drive torque is transferred from input shaft 16 to carrier assembly 112 via engagement of the external gear teeth on input gear 26 and splines 122 on first carrier ring 114. Moreover, drive torque is transferred from carrier assembly 112 to rear output shaft 30 since internal splines 124 on center plate 114 meshingly engage the first set of clutch teeth 44 on rear output shaft 30. Thus, rear output shaft 30 is directly driven at the same rotational speed as input shaft 16. In addition, input shaft 16 is also directly coupled to drive sleeve 58 through engagement of internal splines 126 on second carrier ring 118 with the first set of clutch teeth 60 on drive sleeve 58. However, since mode shift sleeve 84 is maintained in its disengaged "X" position, no drive torque is transferred from drive sleeve 58, hub 72 and mode shift sleeve 84 to drive sprocket 68. Therefore, front output shaft 32 is not drivingly coupled to input shaft 16, whereby the two-wheel high-range mode is established.

Figure 3:
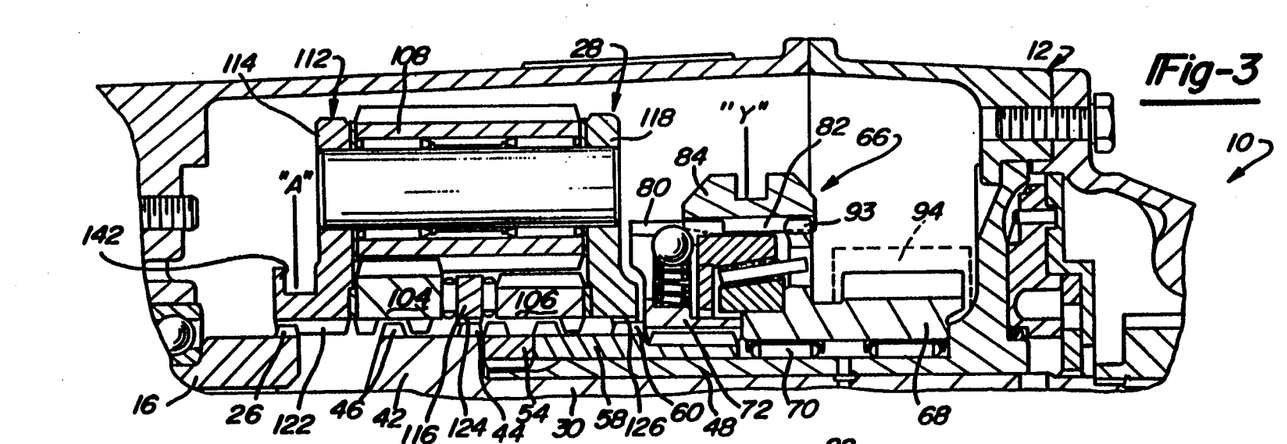
FIG. 3 is an enlarged fragmentary view of FIG. 1 showing the integrated planetary gear assembly in a part-time four-wheel high-range mode.

With reference to FIG. 3, transfer case 10 is shown shifted into its part-time four-wheel high-range operating mode. More particularly, planetary gear assembly 28 is maintained in the "A" position such that input torque is directly transmitted from input shaft 16 to both rear output shaft 30 and drive sleeve 58 via carrier assembly 112. However, mode shift sleeve 84 is shown moved from the disengaged "X" position to an engaged "Y" position. Thus, drive sleeve 58 is now coupled to drive sprocket 68 for driving front output shaft 32. Since carrier assembly 112 is directly coupled for driving both front output shaft 32 and rear output shaft 30 at the same speed, speed differentiation therebetween is inhibited.

Figure 4:
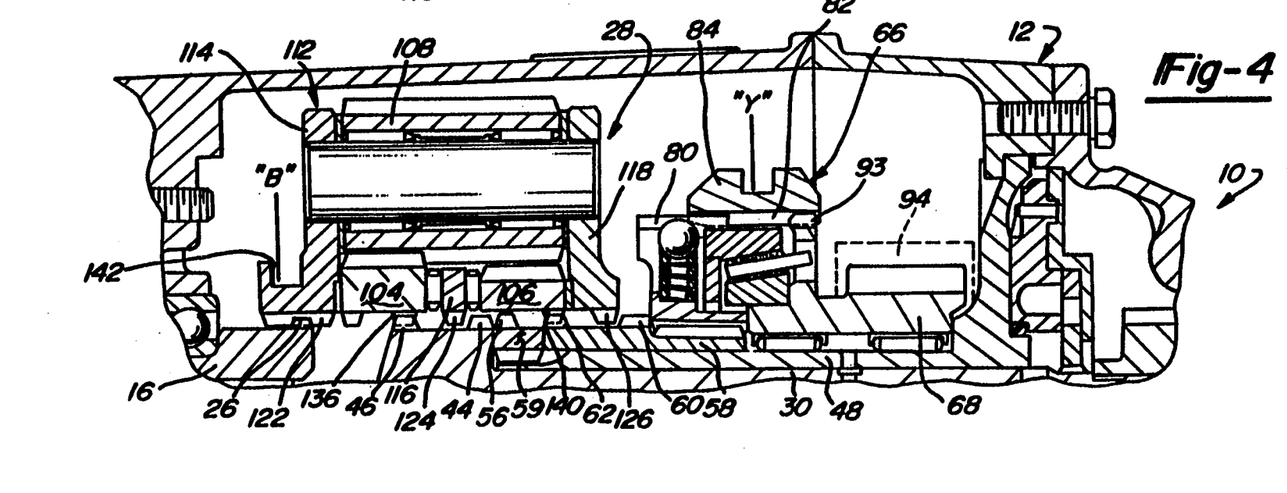
FIG. 4 is a view, similar to FIG. 3, showing the integrated planetary gear assembly in a full-time four-wheel high-range mode.

In FIG. 4, planetary gear assembly 28 is shown positioned so as to place transfer case 10 in the full-time four-wheel high-range mode with interaxle differentiation permitted between rear output shaft 30 and front output shaft 32. More particularly, planetary gear assembly 28 is shown moved forward along central axis 14 to the "B" position while mode shift sleeve 84 is maintained in the engaged "Y" position. As is shown, first carrier ring internal splines 122 remain in driven engagement with the teeth of input gear 26, while the first set of clutch teeth 136 of first sun gear 104 are intermeshed with the second set of clutch teeth 46 on rear output shaft 30. Concurrently, clutch teeth 140 of second sun gear 106 meshingly engage the second set of clutch teeth 62 on drive sleeve 58. In addition, internal splines 124 and 126 of center plate 116 and second carrier ring 118, respectively, are disengaged from other components such that carrier assembly 112 is rotatably driven about axis 14. Thus, input torque is transferred via the first and second sets of planet gears 108 and 110, respectively, to the first and second sun gears 104 and 106, respectively, for driving rear and front output shafts 30 and 32, respectively. Since the first and second sets of planet gears 108 and 110, respectively, remain free to orbit about first and second sun gears 104 and 106, respectively, differential rotational speeds may be accommodated between rear output shaft 32 and front output shaft 30 without the buildup of potentially damaging excessive torque loads. Thus, in this arrangement, a full-time high-range four-wheel mode is established with differential action permitted between front and rear output shafts 32 and 30, respectively.

Figure 5:
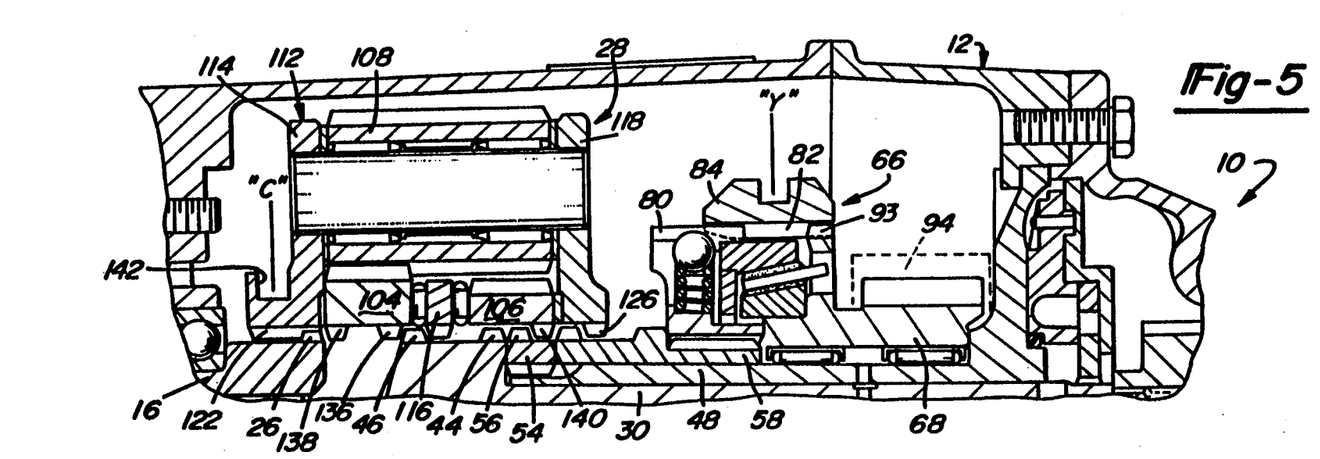
FIG. 5 is a view, similar to FIG. 3, showing the integrated planetary gear assembly in a neutral mode.

With reference to FIG. 5, planetary gear assembly 28 is shown moved along central axis 14 to the "C" position, while mode shift sleeve 84 is maintained in the engaged "Y" position. As is shown, internal splines 122 of first carrier ring 114 are still maintained in engagement with input gear 26. However, center plate 116, second carrier ring 118, first sun gear 104 and second sun gear 106 are disengaged from the output members. Thus, no drive torque is transferred from carrier assembly 112 to either of the front and rear output shafts, whereby transfer case 10 is maintained in a "neutral" state.

Figure 6:
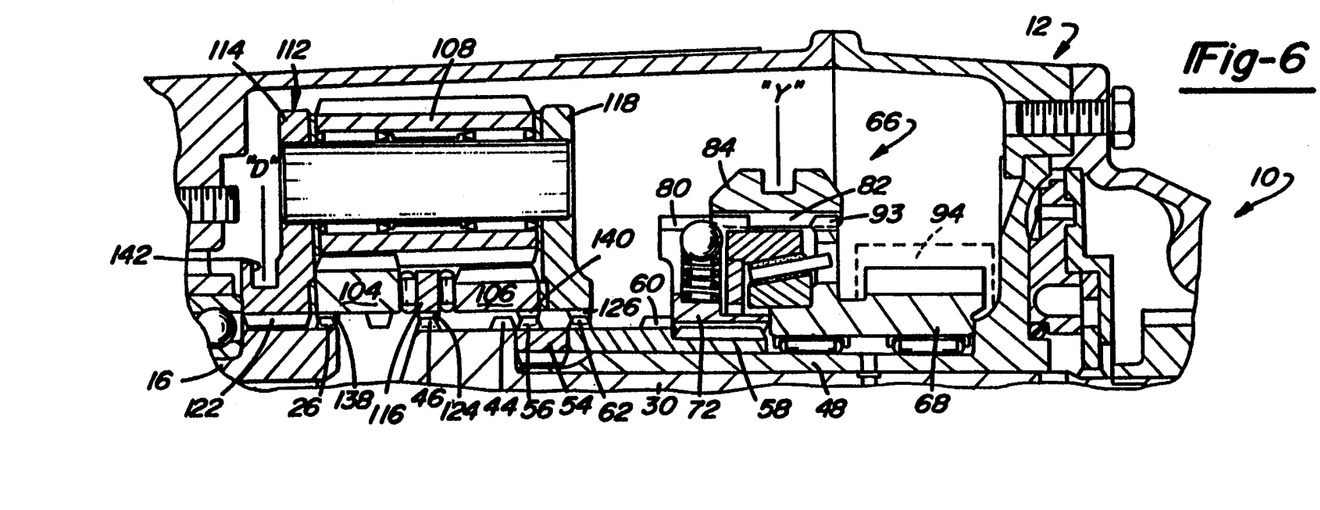
FIG. 6 is a view, similar to FIG. 3, showing the integrated planetary gear assembly in a part-time four-wheel low-range mode.

FIG. 6 illustrates planetary gear assembly 28 moved to the "D" position with shift sleeve 84 still maintained in the engaged "Y" position. More particularly, forward carrier internal splines 122 are moved out of engagement with input gear 26 while the second set of clutch teeth 138 on first sun gear 104 are moved into meshing engagement therewith. In addition, center plate internal splines 124 engage the second set of clutch teeth 46 of rear output shaft 30 while internal splines 126 of second carrier ring 118 engage the second set of clutch teeth 62 on drive sleeve 58. Moreover, second sun gear 106 is grounded (i.e. prevented from rotating) by the engagement of clutch teeth 140 with clutch teeth 56 of reaction ring 54. In this arrangement, input gear 26 drives first sun gear 104 at the rotational speed of input shaft 16. Thus, due to the braked engagement of second sun gear 106 with reaction ring 54, rotation of first sun gear 104 causes first planet gears 108 and second planet gears 110 to orbit about second sun gear 106, thereby driving carrier assembly 112 at a reduced rotational speed. As such, output shafts 30 and 32 are driven at the reduced ratio speed through the engagement of center plate internal splines 124 with output shaft second clutch teeth 46 and second carrier plate internal splines 126 with drive sleeve second clutch teeth 62. Thus, a reduced ratio or part-time four-wheel low-range drive mode is established.

Figure 7:
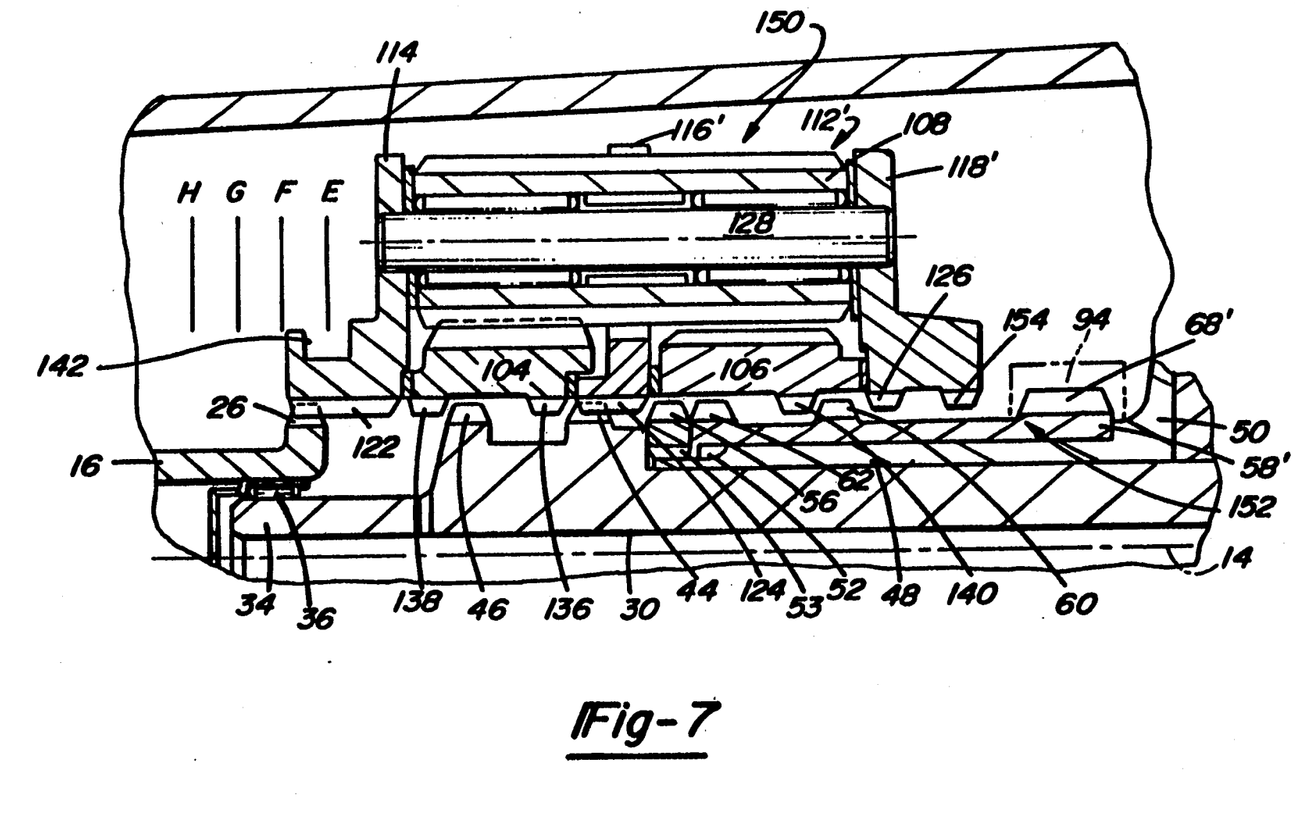
FIG. 7 is a partial sectional view illustrating an alternative construction for an integrated planetary gear assembly that can be readily incorporated into the transfer case shown in FIG. 1.

With reference to FIG. 7, an alternative embodiment of an integrated planetary gear assembly 150 is shown that is substantially similar in structure and function to integrated planetary gear assembly 28 with the exception that the entire unit is adapted to be shifted between a two-wheel high-range mode position and a four-wheel high-range mode position. In general, integrated planetary gear assembly 150 is operably installed between input shaft 16 and first and second output members of transfer case 10 for axial sliding movement relative thereto, such movement establishing the two-wheel drive mode and various four-wheel drive modes. More particularly, integrated planetary gear assembly 150 is axially movable between four distinct positions for establishing the two-wheel high-range mode, the part-time four-wheel high-range mode, a full-time four-wheel high-range mode, and a part-time four-wheel low-range mode. Thus, integrated planetary gear assembly 150 discloses a non-synchronized arrangement wherein drive sleeve 58 and drive sprocket 68 of planetary gear assembly 28 are now integrated into a drive member 152 such that mode shift sleeve 84 is not utilized for selectively coupling such components. For purposes of brevity, like numbers designate similar components to those previously disclosed while primed numbers identify those components that have been slightly modified to facilitate the modified operational characteristics of planetary gear assembly 150.

With continued reference to FIG. 7, the various drive modes will now be described. In the two-wheel high-range mode position shown, planetary gear assembly 150 is located at position "E". In this arrangement, drive torque is transferred from input shaft 16 to carrier assembly 112' via engagement of the external gear teeth on input gear 26 with internal splines 122 on first carrier ring 114. Since internal splines 124' on center plate 114' engage clutch teeth 44 on rear output shaft 30, drive torque is transferred from carrier assembly 112' to rear output shaft 30 such that rear output shaft 30 is driven at the same rotational speed as input shaft 16. As can be seen, drive sleeve portion 58' of drive member 152 is not coupled to second sun gear 104 or second carrier ring 118', whereby no drive torque is transferred to drive sprocket 68' and, in turn, to front output shaft 32. Thus, front output shaft 32 is not coupled to input shaft 16 for establishing the two-wheel high-range mode of operation.

Movement of planetary gear assembly 150 along axis 14 to position "F" establishes the part-time four-wheel high-range mode. In this position, input gear 26 remains coupled to first carrier ring 114' while rear output shaft 30 remains coupled to center plate 116' via engagement of clutch teeth 44 and internal splines 124'. However, such movement of planetary gear assembly 150 cause the first set of internal splines 126 on second carrier ring 118' to meshingly engage the first set of clutch teeth 60 formed on drive sleeve portion 58' of drive member 152. Thus, drive member 152 is coupled to carrier assembly 112' for transferring drive torque to drive sprocket 68' and front output shaft 32. Moreover, since carrier assembly 112' directly couples input shaft 16 to both of the front and rear output shafts, they are driven at the same rotational speed and speed differentiation therebetween is inhibited.

Continued movement of integrated planetary gear assembly 150 to the position identified as "G", is operable for establishing the full-time four-wheel high-range mode wherein differential action between front and rear output shafts 32 and 30, respectively, is permitted. In this position, input gear 26 remains drivingly coupled to front carrier ring 114 while center plate 116' and second carrier ring 118' become disengaged from other components such that carrier assembly 112' acts as an input member as it rotates about central axis 14. Concurrently, clutch teeth 136 of first sun gear 104 intermesh with the second set of clutch teeth 46 on rear output shaft 30. Likewise, clutch teeth 140 on second sun gear 106 intermesh with the second set of clutch teeth 62 on drive sleeve portion 58' of drive member 152. Thus, input torque is transferred from the first set of planet gears 108 to rear output shaft 30 via first sun gear 104. Furthermore, input torque is transferred from the second set of planet gears 110 to drive member 152 and front output shaft 32 via second sun gear 106. Since the first and second sets of planet gears 108 and 110, respectively, orbit about their respective sun gears, differential rotational speeds can be accommodated between front and rear output shafts 32 and 30, respectively.

Finally, upon movement of integrated planetary gear assembly 150 to the "H" position, a part-time four-wheel low-range mode of operation is established. In this position, internal splines 122 on first carrier ring 114 are moved out of engagement with input gear 26 while clutch teeth 138 on first sun gear 104 are moved into meshing engagement with input gear 26. In addition, center plate internal splines 124' engage the second set of clutch teeth 46 of rear output shaft 30 while a second set of internal splines 154 formed on second carrier ring 118' engage the first set of clutch teeth 60 on drive sleeve portion 58' of drive member 152. Moreover, second sun gear 106 is grounded (i.e., prevented from rotating) by the engagement of clutch teeth 140 with clutch teeth 56 of reaction ring 54. In this arrangement, input gear 26 drives first sun gear 104 at the rotational speed of input shaft 16. Thus, due to the braked engagement of second sun gear 106 with reaction ring 54, rotation of first sun gear 104 causes first planet gears 108 and second planet gears 110 to orbit about second sun gear 106, thereby driving carrier assembly 112' at a reduced rotational speed. Since rear and front output shafts 30 and 32, respectively, are directly coupled to carrier assembly 112' they are driven at this reduced ratio speed with differential action therebetween being inhibited. Thus, a reduced ratio or part-time four-wheel low-range drive mode is established.

Figure 8:
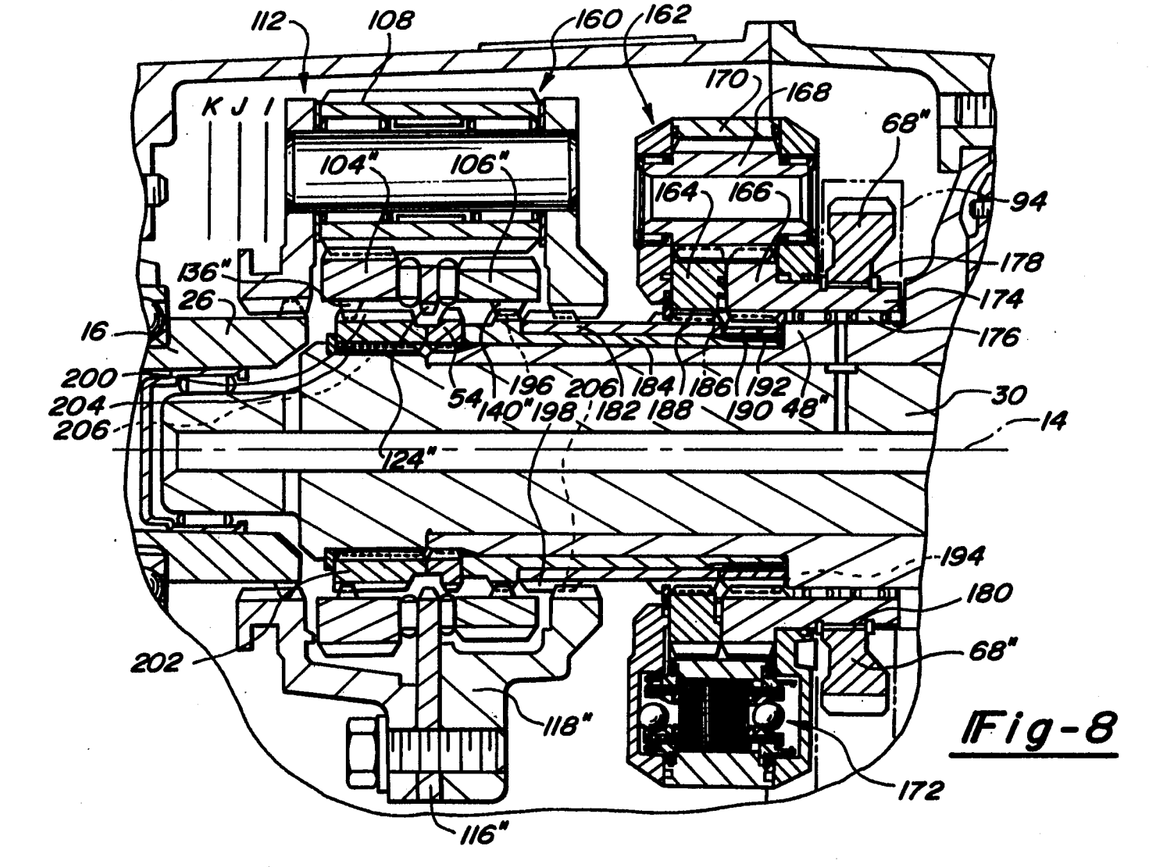
FIG. 8 is a partial sectional view illustrating another alternative construction for an integrated planetary gear assembly that can be readily incorporated into the transfer case shown in FIG. 1 and further illustrating a torque transfer device associated with the integrated planetary gear assembly in accordance with a preferred embodiment of the present invention.

With reference now to FIG. 8, another alternative embodiment of an integrated planetary gear assembly 160 is shown that is substantially similar in structure and function to the integrated planetary gear assembly 150 shown in FIG. 7 with the exception that the entire unit is adapted to be shifted between a differentiated full-time four-wheel high-range mode position and a part-time four-wheel low-range mode position. In general, integrated planetary gear assembly 160 is operably installed between input shaft 16 and first and second output members of transfer case 10 for axial sliding movement relative thereto, such movement establishing the differentiated full-time four-wheel drive high-range mode and the part-time four-wheel drive low-range mode. More particularly, integrated planetary gear assembly 160 is axially moveable between three distinct positions for establishing the full-time four-wheel drive high-range mode position, the part-time four-wheel drive low-range mode position and a neutral position. Also provided and operably associated with the integrated planetary assembly 160 of transfer case 10 is a torque transfer device 162. Torque transfer device 162 may be of any type including, but not limited to, electromagnetic clutches, viscous couplings or geared torque couplings. Suitable viscous coupling devices are disclosed and described in the commonly assigned U.S. Pat. Nos. 5,148,900 and 5,176,235 the disclosures of which are hereby expressly incorporated by reference. A geared torque transfer device is disclosed and described in the commonly assigned U.S. patent application Ser. No. 08/076,008 and U.S. patent application Ser. No. 08/148,461 entitled Temperature and Pressure Compensated Geared Traction Unit by Bowen, et al, filed Nov. 5, 1993, the disclosures of which are expressly incorporated herein by reference. For purposes of brevity, like numbers designate similar components to those previously disclosed while double primed reference numerals identify those components that have been slightly modified to facilitate the modified operational characteristics of planetary gear assembly 160.

In accordance with teaching a preferred embodiment, torque transfer device 162 is shown as a geared torque coupling type device. It should be reiterated, however, that torque transfer device 162 may be of any type coupling device operable for modifying the torque transfer characteristics of integrated planetary assembly 160. The structure and function of geared torque coupling 162 is fully described in the aforementioned U.S. Patent Applications, and only a brief discussion is provided here for purposes of understanding the function of the present invention. Geared torque coupling 162 includes an input sun gear 164 and an output sun gear 166 each of which mesh with a plurality of planet gears 168 journally supported within the device housing 170. Relative rotation of the input and output sun gears 164 and 166 cause a rapid rotation of the planet gears 168 and device housing 170. This rapid rotation initiates pumping of a viscous fluid by the planet gears 168 and sun gears 164 and 166 in a closed circuitous path within housing 170. The pumping of the viscous fluid within housing 170 resists the free rotation of planet gears 168 and housing 170 thereby causing a torque transfer between input and output sun gears 164 and 166, respectively. Pumping of the viscous fluid is controlled and modified by a plurality of valve assemblies 172 disposed within the closed circuitous fluid pumping path. The valve assemblies 172 are operable to modify the flow of the viscous fluid within housing 170 in response to changes in viscous fluid pressure, temperature or both. The result is a change in the torque required to pump the viscous fluid, and therefore, a change in the torque transfer characteristics of geared torque coupling 162. Valve assemblies 172 are further operable to inhibit fluid pumping action under various conditions causing geared torque coupling 162 to become hydraulically locked resulting in direct torque transfer between the input and output sun gears 164 and 166, respectively.

In the presently preferred embodiment, output sun gear 166 is formed with an output stub shaft portion 174 which is journally supported on quill sleeve 48" by bearings 176. Stub shaft portion 174 is formed with external splines 178 which engage internal splines 180 formed on front output sprocket 68" for providing driving torque to chain 94 and hence to front output shaft 32. Driving torque is delivered from the members of integrated planetary gear assembly 160 to the input sun gear 164 via external clutch teeth 186 of drive sleeve 182, which is journally supported over tubular reaction sleeve 184, engaging internal clutch teeth 188 formed on input sun gear 164. Reaction sleeve 184 is journally supported over quill sleeve 48" and provides driving torque from the members of integrated planetary gear assembly 160 to second sun gear 166 via external clutch teeth 190 engaging internal clutch teeth 194 of output sun gear 166 through internal and external clutch teeth formed on front annular drive member 192, and hence providing torque transfer to front output shaft 32 as described.

Figure 9:
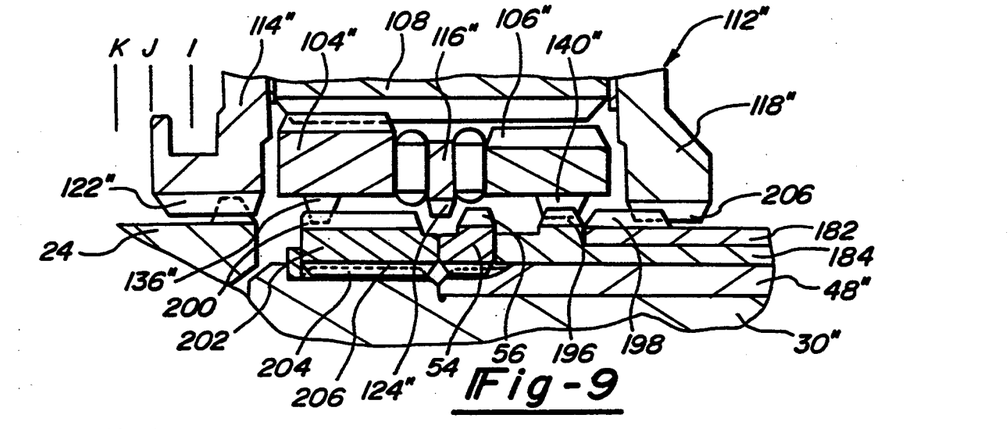
FIG. 9 is an enlarged fragmentary view of FIG. 8 showing the integrated planetary gear assembly in a full-time four-wheel high-range mode.

With reference to FIGS. 8 and 9, in the full-time four-wheel drive high-range mode position shown, planetary gear assembly 160 is located at position "I" and differential action between the front and rear output shafts 32 and 30", respectively is permitted by integrated planetary assembly 160. In this arrangement, drive torque is transferred from input shaft 16 to carrier assembly 112" via engagement of the external gear teeth on input gear 26 with internal splines 122" on first carrier ring 114". Carrier assembly 112" in this arrangement acts as an input member as it is thereby caused to rotate about central axis 14. Concomitantly, clutch teeth 136" of first sun gear 104" intermesh with external clutch teeth 200 of rear annular drive member 202, the internal clutch teeth 204 of which engage external splines 206 of rear output shaft 30". Thus, input torque is transferred from the first set of planet gears 108 to rear output shaft 30" via first sun gear 104". Input torque is also transferred from the integrated planetary second sun gear 106" via clutch teeth 140" engaging clutch teeth 196 of reaction sleeve 184 to the front output shaft 32, as described. Thus, integrated planetary assembly 160 provides a full-time four-wheel drive high-range drive mode with differential action between the front and rear output members.

Rear carrier 118" is formed with internal clutch teeth 206 which engage clutch teeth 198 of drive sleeve 182. Therefore, drive torque is also delivered to the first sun gear 164 of geared torque coupling 162. As will be appreciated, first sun gear 164 is driven via second carrier ring 118" and drive sleeve 182 at a rotational velocity equal to the input shaft 16 rotational velocity. Output sun gear 166 rotates, by way of reaction sleeve 184, at the same rotational velocity as integrated planetary second sun 106", and hence, at the front output rotational velocity. Under normal driving conditions, i.e., where there is no difference between the rotational velocity of front and rear outputs 30" and 32, there is no relative rotation between geared torque coupling 162 input and output sun gears 164 and 166, respectively. However, when relative rotation between the front and rear outputs is introduced, by for example, the ground engaging wheels of either the front or rear axles losing traction, this relative rotation is communicated to the geared torque coupling 162 as a difference between input sun gear 164, rotating at the input shaft 16 rotational velocity, and output sun gear 166. As described, input sun gear 164 is driven at the input shaft 16 rotational velocity, while output sun gear 166 responds to the differential action of integrated planetary assembly 160 and rotates at the front output rotational velocity. Relative rotation between the input and output sun gears 164 and 166, however, is resisted by the geared torque coupling 162 in the manner previously described. As a result, input driving torque from shaft 16 which is communicated to input sun gear 164 is further transferred via geared torque coupling 162 to the front output shaft 32. Concomitantly, torque is transferred, as a result of the resistance to relative rotation of gear torque coupling input and output sun gears 164 and 166, respectively, via reaction sleeve 184, second sun 106", planet gears 110, carrier 112" to first sun gear 104", and hence, to the rear output 30". Driving torque is therefore maintained to both the front and rear output members.

As will be further appreciated, valve assemblies 172 are operable under various conditions to cause hydraulic locking of geared torque coupling 162. When hydraulically locked, geared torque coupling 162 prohibits relative rotation between the input and output suns 164 and 166, respectively. Thus, geared torque coupling 162 is driven at input shaft 16 rotational velocity, and torque is directly coupled to both the input and output members of transfer case 10 providing non-differentiated "on demand" traction mode. That is, driving input torque from input shaft 16 is coupled through geared torque coupling 162 to both the front output 32, by way of second sun gear 166, and to the rear output 30", by way of reaction sleeve 184, integrated planetary second sun gear 106", planet gears 110, carrier 112" and integrated planetary first sun gear 104".

Furthermore, it should be understood that torque coupling 162 is operable prior to hydraulically locking to modify the torque output of planetary gear assembly 160. That is, prior to hydraulically locking, torque coupling 162 provides a progressive torque transfer between the front and rear output members of transfer case 10 as a function of relative rotational velocity between input sun gear 164 and output sun gear 166. Thus, torque is progressively transferred between the front and rear output members of transfer case 10 under conditions of relative rotation but which do not require non-differentiated "on-demand" traction. As should be further appreciated, the hydraulically locked state of torque coupling 162 is only temporary and is a function of driving conditions. Therefore, when conditions are such that the relative rotation between the front and rear output members is eliminated, i.e., traction is restored at each of the driven axles, torque coupling 162 unlocks and transfer case 10 returns to differentiated four wheel drive high-range operation.

Figure 11:
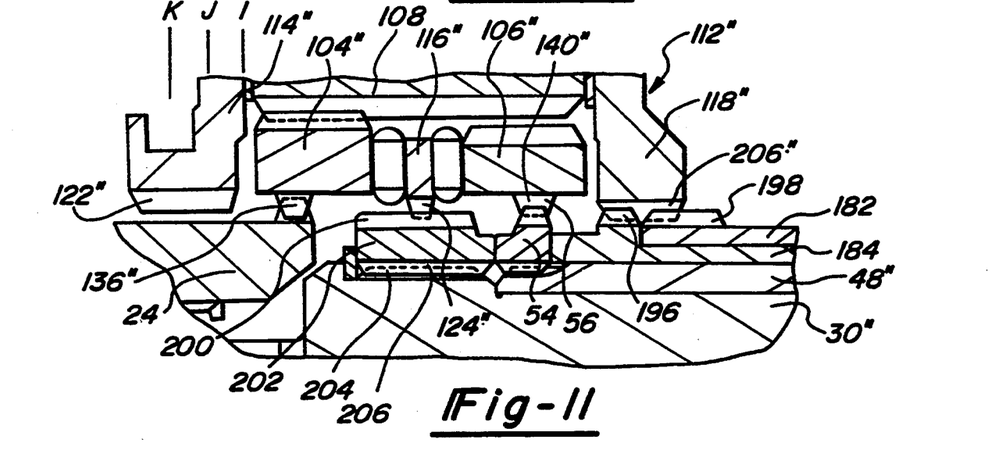
FIG. 11 is a view similar to FIG. 9 showing the integrated planetary gear assembly in a part-time four-wheel drive low-range mode.

With reference to FIG. 12, upon movement of integrated planetary gear assembly 160 to the "K" position, a part-time four-wheel low-range mode of operation is established. In this position, internal splines 122" on first carrier ring 114" are moved out of engagement with input gear 26 while clutch teeth 136" on first sun gear 104" are moved into meshing engagement with input gear 26. In addition, center plate 116" internal splines 124" engage rear annular drive member clutch teeth 200 for providing output to rear output shaft 30" while internal splines 206" formed on second carrier ring 118" engage both external clutch teeth 196 and 198 of drive sleeve 182 and reaction sleeve 184, respectively. Second sun gear 106" is grounded (i.e., prevented from rotating) by the engagement of clutch teeth 140" with clutch teeth 56 of reaction ring 54. In this arrangement, input gear 26 drives first sun gear 104" at the rotational speed of input shaft 16. Thus, due to the braked engagement of second sun gear 106" with reaction ring 54, rotation of first sun gear 104" causes first planet gears 108 and second planet gears 110 to orbit about second sun gear 106", thereby driving carrier assembly 112" at a reduced rotational speed. Since rear and front output shafts 30 and 32, respectively, are directly coupled to carrier assembly 112" they are driven at this reduced ratio speed with differential action therebetween being inhibited. Moreover, since drive sleeve 182 and reaction sleeve 184 are also coupled together, relative rotation of input sun 164 and output sun 166 is inhibited, and geared torque coupling 162 is caused to rotate as a unit at the reduced ratio drive rotational velocity. Thus, a reduced ratio or part-time four-wheel low-range drive mode is established.

With reference to FIG. 11, integrated planetary assembly is shown shifted to the Neutral position indicated at "J". As can be seen, input shaft gear teeth 26 no longer engage carrier clutch teeth 122" or input sun 104" clutch teeth 122". Therefore, input torque is no longer coupled to the integrated planetary assembly 160 and a Neutral mode is established.

While specific embodiments have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed is:

1. A transfer case for a four-wheel drive vehicle comprising:
   a housing;
   an input member supported for rotation in the housing;
   first and second output means supported for rotation in the housing;
   a planetary gear assembly that is axially moveable relative to the input member and the first and second output means between a plurality of positions for selectively transferring torque to the front and rear output means thereby establishing drive modes at least one of which is a full-time four-wheel high-range mode wherein differentiation is provided between the first and second output means; and
   means for modifying the torque output of the planetary gear assembly as a function of relative rotation between the first and second output means.

2. The transfer case of claim 1 wherein the means for modifying the torque output of the planetary gear assembly is further operable for selectively inhibiting differentiation between the first and second output means.

3. The transfer case of claim 2 wherein the means for modifying the torque output of the planetary gear assembly comprises a geared torque coupling.

4. The transfer case of claim 2 wherein the means for modifying the torque output of the planetary gear assembly comprises a viscous coupling.

5. A transfer case for a four-wheel drive vehicle comprising:
   a housing;
   an input member supported for rotation in the housing;
   first and second output means supported for rotation in the housing;
   a planetary gear assembly that is axially moveable relative to the input member and the first and second output means and having a first sun gear, a plurality of first planet gears meshed with the first sun gear and journalled on a carrier, a second sun gear, and a plurality of second planet gears meshed with the second sun gear and journalled on the carrier with each of the second planet gears being meshed with an associated one of the first planet gears, the planetary gear assembly being moveable between a first position for establishing a full-time four-wheel high-range mode and a second position for establishing a part-time four wheel low-range mode; and
   means for modifying the torque output of the planetary gear assembly as a function of relative rotation between the first and second output means.

6. The transfer case of claim 5 wherein when the planetary gear assembly is shifted to the first position, the input member is coupled to the carrier and the first and second sun gears are respectively coupled to the first and second output means.

7. The transfer case of claim 5 wherein when the planetary gear assembly is shifted to the second position, the input member is coupled to the first sun gear, the second sun gear is coupled to the housing and the carrier is directly coupled to the first and second output means.

8. The transfer case of claim 5 wherein the planetary gear assembly is further axially moveable to a third position for establishing a neutral mode.

9. The transfer case of claim 8 wherein when the planetary gear assembly is shifted to the neutral mode, the input member is uncoupled from the carrier and the first sun gear and the carrier is directly coupled to the first and second output means.

10. The transfer case of claim 5 wherein the input member is an input shaft driven by an output shaft of a drivetrain for the vehicle, the first output means is a first output shaft adapted to be coupled to a first set of ground-engaging wheels of the vehicle, and the second output means includes a second output shaft and drive means adapted to be selectively coupled between the planetary gear assembly and the second output shaft for delivering drive torque from the input shaft to the second output shaft, the second output shaft being adapted for interconnection to a second set of ground-engaging wheels of the vehicle.

11. The transfer case of claim 5 wherein the means for modifying the torque output of the planetary gear assembly is further operable for selectively inhibiting differentiation between the first and second output means when the planetary gear assembly is in the first position.

12. The transfer case of claim 5 wherein the means for modifying the torque output of the planetary gear assembly comprises a geared torque coupling.

13. The transfer case of claim 5 wherein the means for modifying the torque output of the planetary gear assembly comprises a viscous coupling.

14. A full-time four wheel drive transfer case comprising:
   a housing;
   an input shaft adapted to be driven by an output shaft of a vehicle drivetrain;
   a first output shaft adapted to be coupled to a first set of ground-engaging wheels of a vehicle;
   a second output shaft and drive means adapted to be coupled between the planetary gear assembly and the second output shaft for delivering drive torque from the input shaft to the second output shaft, the second output shaft being adapted for interconnection to a second set of ground-engaging wheels of a vehicle;
   a planetary gear assembly that is axially moveable relative to the input shaft and the first and second output shafts and having a first sun gear, a plurality of first planet gears meshed with the first sun gear and journalled on a carrier, a second sun gear, and a plurality of second planet gears meshed with the second sun gear and journalled on the carrier with each of the second planet gears being meshed with an associated one of the first planet gears, the planetary gear assembly being moveable between a first position for establishing a full-time four-wheel high-range mode with differentiation between the first and second output shafts and a second position for establishing a part-time four wheel low-range mode; and
   means for modifying the torque output of the planetary gear assembly as a function of relative rotation between the first and second output shafts.

15. The transfer case of claim 14 wherein the means for modifying the torque output of the planetary gear assembly is further operable for selectively inhibiting differentiation between the first and second output shafts when the planetary gear assembly is in the first position.

16. The transfer case of claim 15 wherein the means for modifying the torque output of the planetary gear assembly comprises a geared torque coupling coupled between the carrier and the second sun gear.

17. The transfer case of claim 16 wherein when the planetary gear assembly is shifted to the first position, the input shaft is coupled to the carrier and the first and second sun gears are respectively coupled to the first and second output shafts.

18. The transfer case of claim 17 wherein when the planetary gear assembly is shifted to the second position, the input shaft is coupled to the first sun gear, the second sun gear is coupled to the housing and the carrier is directly coupled to the first and second output shaft.

19. The transfer case of claim 18 wherein the planetary gear assembly is further axially moveable to a third position for establishing a neutral mode.

20. The transfer case of claim 19 wherein when in the neutral mode, the input member is uncoupled from the carrier and first sun gear and the first and second output shafts are directly coupled to the carrier.

* * * * *

UNITED STATES PATENT AND TRADEMARK OFFICE
CERTIFICATE OF CORRECTION

PATENT NO. : 5,411,447
DATED : May 2, 1995
INVENTOR(S) : Barry L. Frost

Figure 10:
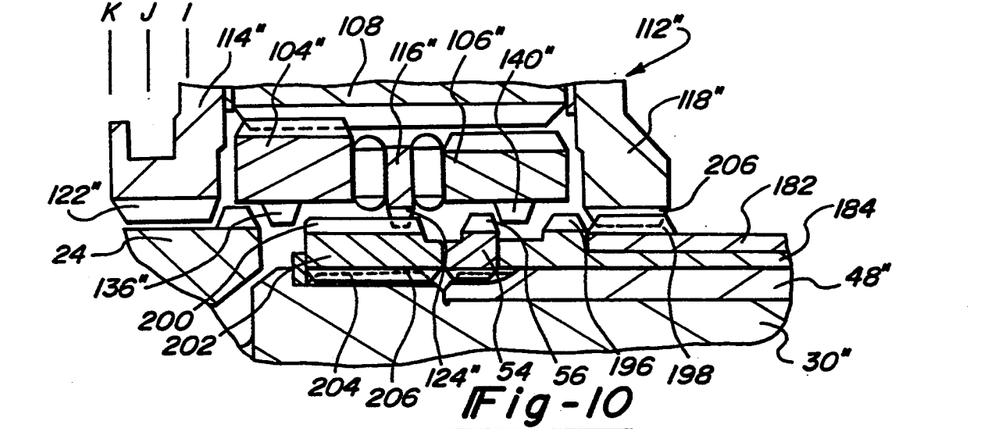
FIG. 10 is a view similar to FIG. 9 showing the integrated planetary gear assembly in a neutral mode.

It is certified that error appears in the above-indentified patent and that said Letters Patent is hereby corrected as shown below:

Column 12, line 16, after "sun" insert --gear--.
Column 12, line 42, after "sun" insert --gear--.
Column 13, line 15, "FIG. 12" should be --FIG. 11--.
Column 13, line 48, "FIG. 11" should be --FIG. 10--.
Column 13, lines 51-52, delete "input sun 104" clutch teeth 122" and insert --sun gear clutch teeth 136".
Column 16, line 36, claim 18, "shaft" should be --shafts--.

Signed and Sealed this

Twenty-second Day of August, 1995

Attest:

BRUCE LEHMAN

Attesting Officer

Commissioner of Patents and Trademarks